United States Patent
Clark et al.

[15] 3,691,701
[45] Sept. 19, 1972

[54] WORK REST FOR A MACHINE TOOL

[72] Inventors: Wilbur R. Clark, Waynesboro, Pa.; Freeman W. Mann, Hagerstown, Md.

[73] Assignee: Landis Tool Company

[22] Filed: Dec. 16, 1970

[21] Appl. No.: 98,803

[52] U.S. Cl. .............................................. 51/238 S
[51] Int. Cl. ........................................... B24b 41/06
[58] Field of Search ....................... 51/238, 103, 105

[56] References Cited

UNITED STATES PATENTS

| | | | |
|---|---|---|---|
| 3,391,500 | 7/1968 | Messier | 51/238 S |
| 3,330,074 | 7/1967 | Stuckey | 51/238 S |
| 3,233,368 | 2/1966 | Price | 51/238 S |
| 2,261,903 | 11/1941 | La Fleur | 51/238 S |
| 1,214,629 | 2/1917 | Wilcox | 51/238 S |

*Primary Examiner*—Harold D. Whitehead
*Attorney*—David S. Urey

[57] ABSTRACT

A work rest (14) for a machine tool, such as a grinding machine (10), includes pivotally mounted upper and lower work supporting arms or jaws (22 and 29) to provide a rigid support for a workpiece (W). The jaws (22 and 29) are movable about their pivot points in order to provide a range of movement for a desired diameter range of the workpiece (W). The position of the lower jaw (29) is advanced by a wedge or spreader (36) which acts between a sloping surface (38) on the lower jaw (29) and a second sloping surface (39) on the base member (16) which is secured to a machine tool carriage (11). This arrangement provides a substantially identical amount of movement between a plunger (34) and a work rest shoe (28), and also provides a metal-to-metal, positive support for the lower jaw (29) to prevent deflection caused by the resultant forces of the machine tool or grinding wheel (12).

9 Claims, 5 Drawing Figures

INVENTORS.
WILBUR R. CLARK
FREEMAN W. MANN

BY David Silvey ATTORNEY

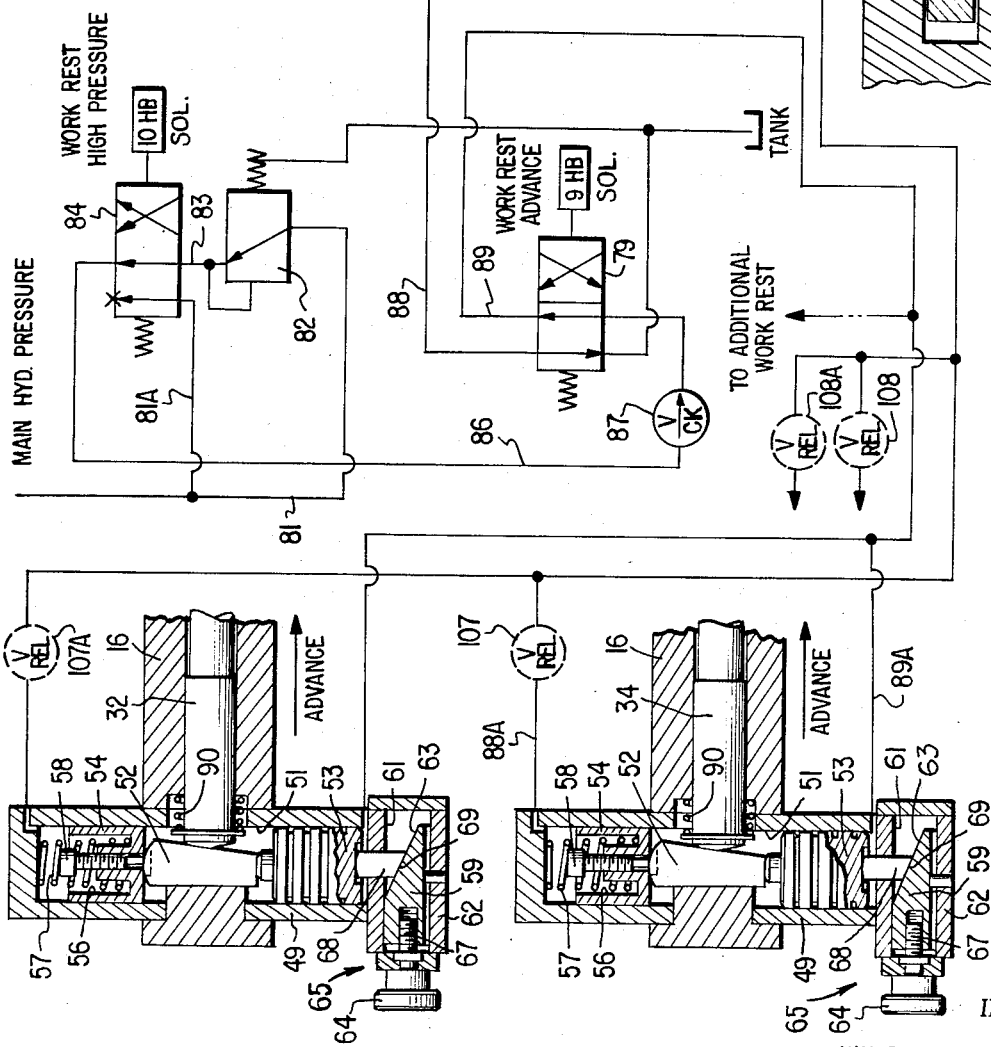

WORK REST FOR A MACHINE TOOL

BACKGROUND OF THE INVENTION

1. Field of the Invention

This invention relates to an improved work rest for an automatic grinding machine such as a cylindrical grinder. The work rest includes upper and lower work engaging shoes which engage the workpiece tangentially at points spaced approximately 90° apart. The upper shoe is on the side of the workpiece opposite the grinding wheel, while the lower shoe is generally beneath the workpiece. The work rest compensates for the resultant forces of the grinding wheel against the workpiece and the weight of the workpiece. The shoes are mounted on arms or jaws which are each pivotably mounted to a base member and are advanced to a positive stop position by fluid pressure, which effects movement of a plunger associated with each jaw. Reduced hydraulic pressure may also be used to advance the upper and lower jaws which allows the shoes to follow the diameter being ground with controlled force.

2. Description of the Prior Art

Prior to this invention, the upper jaw was advanced in a line normal to the axis of the workpiece, and the lower jaw was angularly advanced about a pivot point so that both shoes tangentially engage the periphery of the workpiece. Both jaws were advanced by hydraulically controlled plungers. However, since one jaw was directly advanced in line with the workpiece, and the other was pivotally advanced, a given amount of movement of the plungers, resulted in unequal movement of the work rest jaws. This condition has been alleviated in the present invention by advancing each jaw angularly about a pivot, to maintain tangential contact against the workpiece. A sloping surface is formed on the bottom of the lower jaw in opposition to an opposing sloping surface on the base member. This enables a wedge member to transfer horizontal movement from a plunger, to vertical movement of the jaw which advances the lower work rest shoe an amount equal to the plunger movement. Therefore, a given movement of either plunger results in the same movement of the respective jaws.

One problem in the prior art resulted from the fact that the upper jaw was not adequately supported in the advanced position. This condition has been eliminated by providing pivotably mounted spaced arms to support the upper jaw and thereby eliminate deflection.

Another problem in the prior art resulted from the fact that the lower jaw was a cantilever which could result in a slight downward deflection. This possibility has been eliminated by providing solid metal-to-metal contact between the end of the lower jaw and the machine carriage. Movement of the lower jaw is provided by a plunger which acts as a wedge between sloping surfaces of the lower jaw and the carriage. Typical prior art work rests are disclosed in Price U.S. Pat. No. 3,233,368, issued on Feb. 8, 1966; Stuckey U.S. Pat. No. 3,330,074, issued on July 11, 1967; and Messier U.S. Pat. No. 3,391,500, issued on July 9, 1968.

SUMMARY OF THE INVENTION

In accordance with the invention, a machine tool, such as a grinding machine, includes a tool for performing a machining operation. A work rest, including upper and lower arms with shoes thereon, supports the workpiece against the tool. The opening and closing of the upper and lower arms can be effected by advancing or retracting respective plungers. A mechanical linkage is actuated by the plunger of the lower arm for raising and lowering said arm and for providing a metal-to-metal column support between the shoe end of the arm and the machine frame to minimize deflection thereof.

In the preferred embodiment, the lower arm includes a sloping, camming surface which is resiliently held in engagement with the end of the plunger. The plunger may also cooperate with a second sloping, camming surface fixed to the work rest base member. The angles of the camming surfaces and the length of the lower arm are designed such that a lateral movement of the plunger is transmitted into a substantially equal movement of the tangential face of the lower shoe toward the center of the workpiece.

It is therefore, an object of the present invention to support the periphery of a cylindrical workpiece by providing a solid support for each work engaging shoe to enable a workpiece diameter to be ground to precision tolerances.

Another object is to control the movement of the upper and lower work rest jaws, from a preset hydraulic pressure, until the specific end point or stop position is reached.

Another object is to provide predetermined forces against the workpiece diameter to compensate for the resultant forces from the grinding wheel to prevent deflection.

Another object is to provide means to enable the work rest to be used as a follow-up type rest.

Another object is to simplify the micrometer adjustment for each of the stop positions by using a substantially identical one-to-one mechanical ratio between each of the plungers which advance the upper and lower jaws and the movement of the work rest shoes.

BRIEF DESCRIPTION OF THE DRAWINGS

With the above and other objects in view that will hereinafter appear, the nature of the invention will be more clearly understood by reference to the following detailed description, the appended claims and the several views illustrated in the accompanying drawings, wherein:

FIg. 2 is a sectional end view taken along the line 2—2 of FIG. 1, showing the pivotable arrangement of the upper jaws;

FIG. 3 is a sectional plan view taken along the line 3—3 of FIG. 1, showing the pivotable arrangement of the lower jaw;

FIG. 4 is a schematic diagram of the hydraulic circuit and shows the micrometer adjustment means for controlling the amount of movement.

DESCRIPTION OF THE PREFERRED EMBODIMENTS

Figure 1:
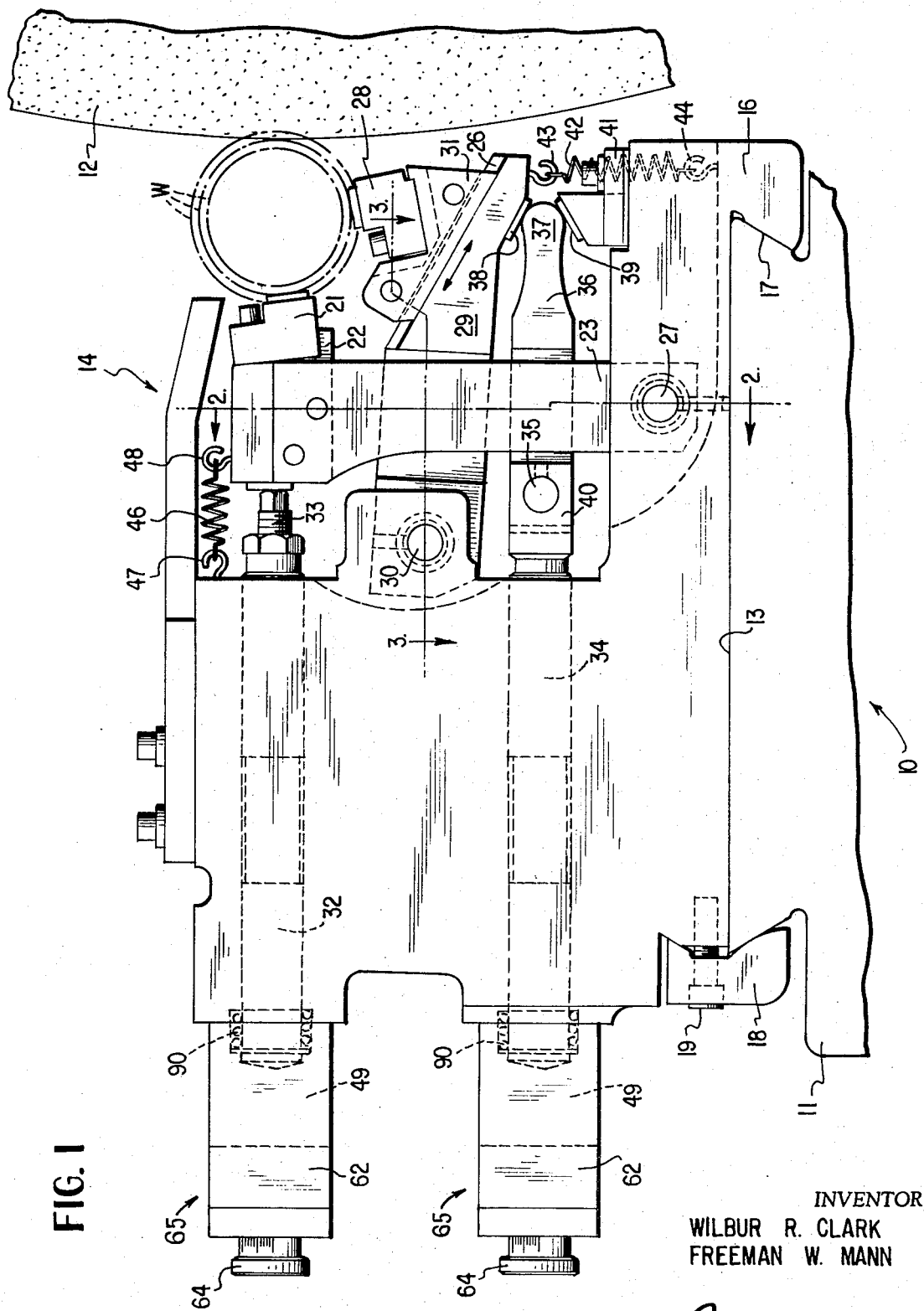
FIG. 1 is a fragmentary transverse sectional view taken through a grinding machine showing the work rest in elevation supporting a workpiece being ground.

Referring now to the drawings in detail, there is illustrated in FIG. 1, the basic components of a work rest for a grinding machine which is generally identified by the numeral 10. It is to be understood that the invention pertains to machine tools in general, but for the purpose of explanation, the invention will be described hereinafter as it specifically relates to a grinding machine.

The grinding machine 10 is of a conventional construction, and therefore, only the components which specifically relate to the supporting of the workpiece W will be discussed. The grinding machine 10 includes a work carriage 11, which is slidably mounted on the machine bed (not shown). Suitable support members, such as a headstock and a tailstock, (not shown), are mounted on the carriage 11 to support a workpiece W, and to provide means to rotate the workpiece W about a predetermined axis. The grinding machine 10 also includes a grinding wheel 12 which is supported in the customary manner for rotation and for advancing and retracting movement relative to the workpiece W.

As is shown in FIG. 1, the carriage 11 is provided with a guide 13, which extends longitudinally on the grinding machine 10. A work rest, which is constructed in accordance with this invention and is generally identified by the numeral 14, is mounted on the guide 13 and is adapted to be secured thereto in a longitudinally adjustable position for supporting the desired portions of the workpiece W during a grinding operation.

The work rest 14 includes a base member 16 having a lower portion thereof which defines a seat 17 to match the guide 13. A clamp member 18 locks the base member 16 in the selected position by means of a fastener 19.

An upper work engaging shoe 21 is secured to an upper jaw 22 which is secured to a pair of spaced arms 23 and 24, as shown in FIGS. 2 and 3. The arms 23 and 24 are pivoted about a pin 27, which is secured to the base member 16 to provide a rigid support for the upper jaw 22. A lower work engaging shoe 28 (FIG. 1) is secured to a shoe support member 31 which is slidably mounted on and secured to an inclined dovetail 26, formed on the free end of a lower jaw 29. The lower jaw 29 is pivotably mounted about a pin 30 (FIG. 3) which is secured to the base member 16. The support member 31 is locked in a preset position on the inclined surface of the lower jaw 29 (FIG. 1) for the particular size range of the workpiece W.

The upper shoe 21 is advanced into contact with the workpiece W by a plunger 32 through an adjusting screw 33. The lower shoe 28 is advanced into contact with the workpiece W by movement of a plunger 34, through a spreader 36 which is pivotably mounted to a clevis member 40 by a pin 35. The clevis member 40 is secured to the plunger 34. The spreader 36 has a round nose 37 which contacts opposed sloping or wedge surfaces 38 and 39 as the plunger 34 is advanced. The wedge surface 38 is formed on the bottom portion of the lower jaw 29; and the opposing wedge surface 39 is formed on a wedge member 41 which is secured to the base member 16. Ideally, the angles on the sloping surfaces 38 and 39 and the length of the jaw 29, are selected so that a given horizontal movement of the plunger 34 is transmitted into the same amount of movement of the tangential face of the lower shoe 28 toward the center of the workpiece W. A tension spring 42 connected between eyebolts 43 and 44 holds the surface 38 against the round nose 37 of the spreader 36, and the spreader 36 is retained against the wedge surface 39. A tension spring 46 connected between eyebolts 47 and 48 holds the upper jaw 22 against adjusting screw 33.

The plungers 32 and 34, as shown in FIGS. 1 and 4, have the same type of actuating mechanism and, therefore, only the actuating mechanism for the plunger 32 will be described. Both actuating mechanisms are shown in FIG. 4; however, the corresponding elements for effecting movement of the plungers 32 and 34 are identified by the same reference numerals.

The actuating mechanism for the upper plunger 32 as shown in FIGS. 1 and 4 consists of a housing 49 having an opening 51. In the upper portion of the housing 49, there is positioned a piston 54 having an annular groove 56 which retains a compression spring 57. The spring 57 retains the piston 54 against the upper surface of a cam 52, which is retained in engagement with the end of the plunger 32. In the lower portion of the housing 49, there is provided a piston 53 which is raised by hydraulic pressure. The lowermost position of the piston 53 is controlled by a stop 68. The stop 68, in turn, can be raised or lowered by a cam 59 having a sloping surface 63 which cooperates with the bottom sloping surface 69 of the stop 68.

In FIG. 4, the cam 52 and the plunger 32 are shown in their advanced positions. The cam 52 is raised to its initial starting position by applying hydraulic pressure to the lower end of the piston 53. In order to advance the cam 52 and plunger 32 in the next cycle of operation, hydraulic pressure is applied to the upper surface of the piston 54. This hydraulic force acts to lower the cam 52 and thereby advance the plunger 32 to the right (FIG. 4). The hydraulic force provides a constant pressure to advance the plunger 32, which retains the upper shoe 21 against the workpiece W to prevent deflection. As previously stated, the downward limit of this movement is controlled by the stop 68. The upward movement of the piston 54 is limited by the adjustment of a screw 58 in threaded engagement with the piston 54. This limits the retraction of the plunger 32 and the amount of retraction of the jaw 22.

Micrometer adjusting means 65 are provided to determine the forward end point or stop position of the upper shoe 21 and to provide adjustment to compensate for wear of the shoe 21. The cam 59 is slidably mounted in a bore 61 of a micrometer housing 62, which is secured to the housing 49. The cam 59 is positioned by rotation of a graduated dial 64, which rotates a threaded portion 67 in threaded engagement with the cam 59, to alter the position of the stop 68, to control the maximum amount of allowable movement of the plunger 32 in forward direction.

OPERATION

It should be understood that the number of work rests 14 used on a particular machine is determined by the length of the particular workpiece W, the amount of stock to be removed, and by the amount of deflection which is generated during the grinding operation. Any number of work rests can be advanced onto the workpiece W simultaneously from a single signal, which is effected automatically during the automatic cycle.

The operation of the work rest 14 is controlled by a source of fluid pressure which is directed to the housings 49—49. The plungers 32 and 34 which are rapidly advanced by the lowering of the cams 52—52 until the pistons 53—53 are advanced against the stops 68—68. The shoes 21 and 28 are retained against the workpiece W to prevent deflection of the workpiece W from the resultant forces of the grinding wheel 12, by a mechanical lock-up of the cams 52—52, which prevents the plungers 32 and 34 from being retracted until the cams 52—52 are raised by fluid pressure. The above arrangement is used when the word rest 14 is used as a positive or a follow-up type work rest, to support a workpiece diameter. The work rest jaws 22 and 29 are advanced to a positive position automatically during the normal grinding operation as described hereinafter.

The means for advancing and retracting the grinding wheel 12 is the subject matter of co-pending application, Ser. No. 45,828, filed June 12, 1970, and will not be included in the present invention.

The grinding wheel 12 is advanced toward the workpiece W for predetermined distances and at predetermined rates after the workpiece W has been properly positioned in alignment with the grinding wheel 12, and after the headstock (not shown) has begun workpiece rotation.

A sequence control counter (not shown) determines the rate of infeed, the end points, and the dwell periods in the grinding operation, by controlling the rate and number of pulses directed to an electro-hydraulic pulse motor (not shown). The motor moves the grinding wheel 12 transversely for preselected distances until a size signal is obtained by means of a gage (not shown).

The grinding wheel 12 is advanced at a rapid infeed rate, and then at a fast approach feed rate which continues until a load control relay (not shown) is deenergized by contact between the grinding wheel 12 and the workpiece W. This reduces the infeed rate of the grinding wheel 12 to a first grinding feed rate.

The work rest jaws 22 and 29 are advanced under low pressure during the first feed rate, to provide adequate support for the workpiece W, while the extreme elliptical portions of the workpiece W are being removed in a conventional manner.

Figure 5:
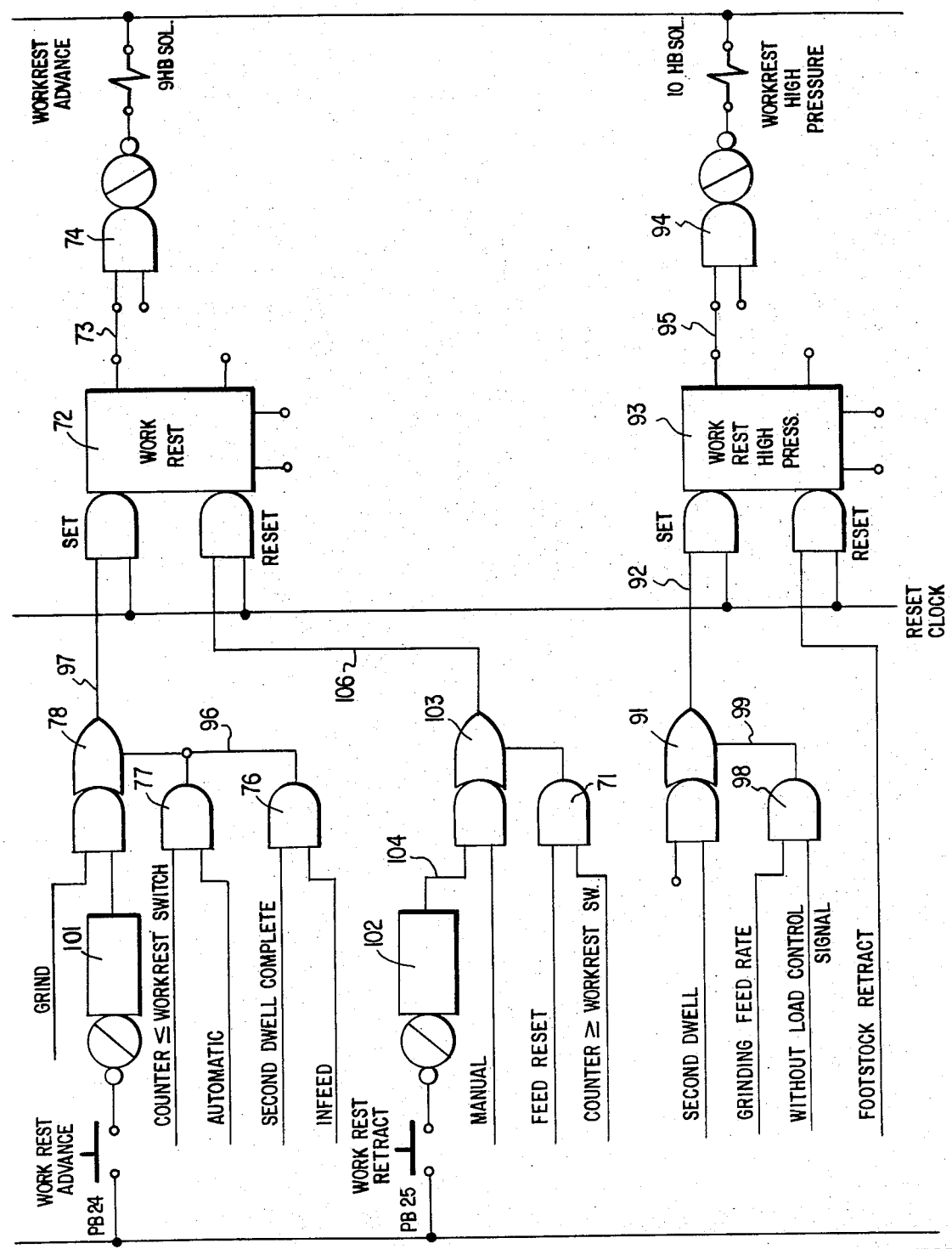
FIG. 5 is an electrical circuit diagram of the controls for the operation of the work rest.

The electrical circuit diagram as shown in FIG. 5 controls the movement of the jaws 22 and 29, wherein the output from a work rest flip-flop 72 is directed via a line 73 to an output converter 74, which converts the d-c voltage signal to an a-c voltage signal, and a work rest advance solenoid 9HB SOL is energized. This signal occurs during the automatic cycle when the counter (not shown) is less than or equal to the number set on the work rest switch (not shown). A signal is provided through an expander 77, which is connected to an AND gate 78 to provide a signal to energize or set the flip-flop 72, by a line 97.

Energization of the solenoid 9HB SOL shifts a control valve 79 (FIG. 4) to the left, and main pressure from a hydraulic source directs fluid pressure from a line 81 through a pressure reducing valve 82. A line 83 directs hydraulic fluid through a control valve 84 and through a line 86, which connects the valve 84 to the valve 79. A check valve 87 is coupled to the line 86 to prevent the flow of fluid in the reverse direction. Fluid pressure from the valve 79 is directed to the upper housing 49 through a line 88, and to the lower housing 49 through a line 88A, which branches from the line 88. The pistons 54—54 are lowered, which lowers the cams 52—52, to advance the plungers 32 and 34 to the right (FIGS. 1 and 4).

The movement of the plungers 32 and 34 effects the pivotal movement of the upper jaw 22 and the lower jaw 29. The upper jaw 22 is angularly advanced in a clockwise direction and the lower jaw 29 is angularly advanced in a counter-clockwise direction which raises the support member 31 secured thereto. The work rest shoes 21 and 28 are thereby advanced against the periphery of the workpiece W at a slow rate. The grinding wheel 12 continues to advance until the end point of the first feed rate is reached.

The grinding wheel 12 is retracted a small amount following a first dwell period after the end point of the first feed rate has been completed. This movement is effected to reset the feed system.

The flip-flop 72 (FIG. 5) is reset when the work rest counter (not shown) is greater than or equal to the position of the grinding wheel 12. A reset signal is directed from an expander 71 to an AND gate 103, and then through a line 106 which resets the flip-flop 72. The resetting of the flip-flop 72 deenergizes the solenoid 9HB SOL.

The deenergization of the solenoid 9HB SOL allows the valve 79 (FIG. 4) to be shifted to the right by spring pressure and fluid pressure from the line 86 is now directed through the control valve 79 to a line 89 and a line 89A, which are connected to the bottom of the housings 49—49. The pistons 53—53 are raised to retract the cams 52—52. The plungers 32 and 34 are retracted by the pressure from the compression springs 90—90, thereby retracting the upper and lower jaws 22 and 29.

A second dwell period is effected following the reset of the grinding wheel 12, and the gage is advanced in a conventional manner. A signal is provided during the second dwell period through and AND gate 91, and a line 92 from the AND gate 91 provides a voltage signal to set a high pressure work rest flip-flop 93, when the grinding wheel 12 is reset. A signal from the flip-flop 93 is directed to an output converter 94 by a line 95, to energize a high pressure work rest solenoid 10HB SOL. The control valve 84 (FIG. 4) is shifted to the left and hydraulic fluid is directed through the lines 81 and 81A to the control valve 84 at a high pressure. The line 86 now directs fluid pressure to the control valve 79 at a high rate.

The grinding wheel 12 is advanced after completion of the second dwell period, and a signal is effected to advance the work rest jaws 22 and 29 at a rapid rate, providing the grinding wheel 12 is in the forward position. A signal is directed through an expander 76 to the AND gate 78 by a line 96. The signal is directed to the work rest flip-flop 72 through a line 97, to provide a signal to energize the work rest advance solenoid 9HB SOL, through the line 73 and the converter 74.

The energization of the solenoid 9HB SOL shifts the control valve 79 to the left and fluid pressure is now directed from the line 86 through the valve 79, to the line 88, and to the line 88A. The upper and lower jaws 22 and 29 are advanced at a rapid rate to advance the work rest shoes 21 and 28 against the periphery of the workpiece W. This movement continues until the cams 52—52 advance the pistons 53—53 against the stops 68—68 as shown in FIG. 4. This movement is completed prior to the grinding wheel 12 contacting the workpiece W, to provide the required support to prevent deflection during the actual grinding operation.

Means are provided to advance the work rest jaws 22 and 29 at the start of the first grinding feed rate even though the load control relay (not shown) is not tripped. Should this condition exist, the grinding wheel 12 will not be reset, and the work rest jaws 22 and 29 will be advanced by low fluid pressure during the fast approach feed rate as previously discussed. The high pressure work rest solenoid 10HB SOL is energized when the flip-flop 93 is set by a signal which is directed from an expander 98 to the AND gate 91 by a line 99, and the line 92 directs a signal from the AND gate 91 to the flip-flop 93. This signal occurs when the grinding feed rate is effected without a memory of the load control relay being tripped.

The work rest jaws 22 and 29 can be advanced in the manual cycle by depressing a work rest advance pushbutton PB24, when the machine is in the grinding mode. An a-c voltage signal is directed through an input converter 101 which converts the signal to a logic level and directs a d-c signal to the AND gate 78. A signal from the AND gate 78 is directed to the flip-flop 72 by a line 97. The flip-flop 72 is set which energizes the solenoid 9HB SOL as previously stated.

The work rest jaws 22 and 29 can be retracted in the manual cycle by depressing a work rest retract pushbutton PB25. A circuit is completed through an input converter 102 to provide a signal to the AND gate 103 through a line 104. A signal from the AND gate 103 is directed through the line 106 to reset the flip-flop 72. The resetting of the flip-flop 72 deenergizes the work rest advance solenoid 9HB SOL, and the jaws 22 and 29 are retracted.

In the above operation, the work rest 14 was used as a follow-up type rest when low fluid pressure was used during the initial grinding operation until the end point of the first feed rate was reached. The work rest 14 was then used as a positive rest during the remaining grinding operation. The work rest 14 may be used as a follow-up type rest by using a low hydraulic pressure during the complete grinding operation. The upper and lower jaws 22 and 29 will advance the respective shoes 21 and 28 at a continuous slow rate as the diameter being ground is reduced in size, until the pistons 53—53, which are advanced by the cams 52—52, contact the stops 68—68, or until size is obtained from a gage (not shown) in a conventional manner.

The upper and lower jaws 22 and 29 are advanced at a rate controlled by pressure reducing valves 107 and 107A which are coupled to the lines 88A and 88 when a single work rest 14 is used. Pressure reducing valves 108 and 108A would be coupled to additional lines (unnumbered) for an additional work rest. The upper and lower jaws 22 and 29 will be advanced at a slow rate to allow the upper and lower shoes 21 and 28 to follow the diameter of the workpiece W, with sufficient force to prevent deflection of the workpiece W, as the diameter is being reduced by stock removal during the grinding operation.

The work rest 14 may also be used to support preground diameters of the workpiece W. A single adjustable fluid pressure would be used to provide a rigid support of the workpiece during the grinding operation. Means would be provided to retract the upper and lower jaws 22 and 29 to allow the workpiece to be loaded and unloaded in a conventional manner.

While the invention is described in detail with the reference to an automatic work rest 14, wherein movement of the lower jaw 29 is effected by movement of the spreader 36, in response to movement of the plunger 34, it should be understood that the support member 31 could be formed as part of the upper jaw 29. The support member 31 would be eliminated. However, the diameter range of the workpiece W would be reduced and range adjustment would be changed by inserting work shoes 21 and 28 having variable heights.

It should also be understood that the wedge surface 38 could be formed on an adjusting arm (not shown), which if pivoted from the pin 30, would transfer a vertical force to the lower jaw 29 without changing the desired ratio between the plunger and shoe movement. The support member 31 would not be required in this arrangement.

It is also to be understood that only a preferred embodiment of the invention has been specifically illustrated and described, and variations may be made thereto without departing from the invention, as defined in the appended claims.

We claim:

1. In a machine tool for performing a machining operation on a workpiece, a machine frame, a tool, means for supporting and advancing said tool toward the workpiece for a machining operation, a work rest for supporting the workpiece against said tool, said work rest includes upper and lower arms having work rest shoes thereon, the improvement comprising:

means for adjusting the position of said upper and lower arms including a plunger associated with each arm;

a mechanical linkage means actuated by said plunger for raising and lowering said arm and for providing a substantially vertical metal-to-metal column support between the shoe end of said arm and said machine frame to minimize deflection thereof; and a sloping, camming surface on said lower arm;

a sloping, camming surface on said machine frame, said two surfaces being opposed to one another to form a generally V-shaped opening; and said plunger being mounted for sliding engagement between said surfaces to raise and lower said lower arm.

2. In a grinding machine, including a machine frame, a grinding wheel support, a grinding wheel on said wheel support, feeding means for transversely advancing said grinding wheel toward a workpiece for a grinding operation, a work rest for supporting the workpiece against said grinding wheel, said work rest including an upper shoe for supporting the workpiece against generally transverse forces and a lower shoe for supporting the workpiece against generally downward forces, the improvement comprising:

means for adjusting the position of said lower shoe including;

a pivotable lower arm for supporting the lower shoe;

a plunger associated with the lower arm for raising and lowering said shoe and for providing a substantially vertical metal-to-metal column support between said shoe and said machine frame;

a sloping, camming surface on said lower arm;

a sloping, camming surface on said machine frame, said two surfaces being opposed to one another to form a generally V-shaped opening; and said plunger being mounted for sliding engagement between said surfaces to raise and lower said lower arm.

3. In a grinding machine, including a machine frame, a grinding wheel support, a grinding wheel on said wheel support, feeding means for transversely advancing said grinding wheel toward a workpiece for a grinding operation, a work rest for supporting the workpiece against said grinding wheel, said work rest including an upper arm having a shoe at one end for supporting the workpiece against generally transverse forces and a lower arm having a shoe for supporting the workpiece against generally downward forces, the improvement comprising:

means for adjusting the position of said lower shoe including a plunger;

a mechanical linkage actuated by said plunger, said linkage being associated with the lower arm at the shoe end for raising and lowering the shoe and said linkage providing a substantially vertical metal-to-metal column support between the shoe end of said arm and said machine frame to minimize deflection thereof; and a sloping, camming surface on said lower arm;

a sloping, camming surface on said machine frame, said two surfaces being opposed to one another to form a generally V-shaped opening; and said plunger being mounted for sliding engagement between said surfaces to raise and lower said lower arm.

4. A grinding machine as recited in claim 3, which further comprises:

resilient means for urging said two camming surfaces together to maintain continuous contact with said plunger.

5. A grinding machine as recited in claim 3, wherein said plunger has a rounded leading surface for cooperation with said two sloping, camming surfaces.

6. A grinding machine as recited in claim 3, wherein the angles on said two sloping surfaces and the length of said lower arm are selected such that a lateral movement of said plunger is transmitted into a substantially equal movement of the lower shoe in the direction of the center of said workpiece.

7. A grinding machine as recited in claim 3, which further comprises:

a second plunger for adjusting the position of said upper shoe; and separate and rotatable micrometer adjusting means for adjusting the end position of said plungers; whereby equal rotation of said micrometer adjusting means adjusts the end positions of the upper and lower shoes in the direction of the center of the workpiece by a substantially equal amount.

8. A grinding machine as recited in claim 7, wherein each of said micrometer adjusting means comprises:

a housing;

a graduated dial having a threaded portion;

a sliding cam in said housing threadedly engaged with said threaded portions;

cam means in engagement with the end of said plunger;

means for advancing said cam means and a stop member positioned between said sliding cam and said cam means for limiting the advance of said plunger and said respective work rest shoe.

9. In a grinding machine, including a machine frame; a grinding wheel support, a grinding wheel on said wheel support, feeding means for transversely advancing said grinding wheel toward a workpiece for a grinding operation, a work rest for supporting the workpiece against said grinding wheel, said work rest including an upper arm having a shoe at one end for supporting the workpiece against generally transverse forces and a lower arm having a shoe for supporting the workpiece against generally downward forces, the improvement comprising:

a pair of plungers, one in cooperative engagement with each of said upper and lower arms for advancing the arms toward the workpiece, cam means associated with each plunger for advancing said plungers against the upper and lower arms, respectively;

stop members for limiting the advance of each of said cam means; and micrometer adjusting means including a sliding wedge in operative engagement with each of said stop members for positioning the stop members in a known position to limit the advance of said cam means, so that a given rotation of each of said micrometer adjusting means limits the advance of the respective upper and lower work rest shoes toward the center of the workpiece.

* * * * *